United States Patent
Banerjee

(10) Patent No.: US 9,448,826 B2
(45) Date of Patent: Sep. 20, 2016

(54) ENFORCING POLICY-BASED COMPLIANCE OF VIRTUAL MACHINE IMAGE CONFIGURATIONS

(71) Applicant: Symantec Corporation, Mountain View, CA (US)

(72) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 506 days.

(21) Appl. No.: 13/838,929

(22) Filed: Mar. 15, 2013

(65) Prior Publication Data

US 2014/0282518 A1    Sep. 18, 2014

(51) Int. Cl.
*G06F 9/455* (2006.01)
*G06F 21/53* (2013.01)

(52) U.S. Cl.
CPC ........... *G06F 9/45533* (2013.01); *G06F 21/53* (2013.01); *G06F 2009/45575* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 2003/0051021 A1 | 3/2003 | Hirschfeld et al. | |
| 2008/0134177 A1 | 6/2008 | Fitzgerald et al. | |
| 2009/0138877 A1* | 5/2009 | Fitzgerald et al. | 718/1 |
| 2010/0319004 A1 | 12/2010 | Hudson et al. | |
| 2011/0055396 A1 | 3/2011 | Dehaan | |
| 2011/0314466 A1* | 12/2011 | Berg et al. | 718/1 |
| 2012/0030672 A1* | 2/2012 | Zygmuntowicz et al. | 718/1 |
| 2012/0110188 A1 | 5/2012 | Van Biljon et al. | |
| 2012/0204187 A1 | 8/2012 | Breiter et al. | |
| 2012/0303776 A1 | 11/2012 | Ferris | |
| 2014/0082614 A1* | 3/2014 | Klein et al. | 718/1 |

OTHER PUBLICATIONS

International Search Report for PCT application No. PCT/US2014/022609 mailed Aug. 15, 2014.

* cited by examiner

*Primary Examiner* — Diem Cao
(74) *Attorney, Agent, or Firm* — Patterson & Sheridan, LLP

(57) ABSTRACT

Techniques are disclosed for data risk management in accessing an Infrastructure as a Service (IaaS) cloud network. More specifically, embodiments of the invention evaluate virtual machine images launched in cloud-based environments for compliance with a policy. After intercepting a virtual machine image launch request, an intermediary policy management engine determines whether the request conforms to a policy defined by a policy manager, e.g., an enterprise's information security officer. The policy may be based on user identities, virtual machine image attributes, data classifications, or other criteria. Upon determining whether the request conforms to policy, the policy management engine allows the request, blocks the request, or triggers a management approval workflow.

22 Claims, 7 Drawing Sheets

ENFORCING POLICY-BASED COMPLIANCE OF VIRTUAL MACHINE IMAGE CONFIGURATIONS

BACKGROUND

1. Field

Embodiments of the invention generally relate to techniques for data risk management in accessing an Infrastructure as a Service (IaaS) cloud network. More specifically, embodiments of the invention evaluate virtual machine images launched in cloud-based environments for compliance with a policy.

2. Description of the Related Art

Cloud network security is a well-known issue in numerous contexts. With Information as a Service (IaaS) cloud networks increasing their reach within enterprises, access control becomes a growing concern. Presently, users can launch an arbitrary virtual machine image with access to cloud storage resources on an IaaS network. Without adequate access control support, the risk of data breach increases when these arbitrary images are launched. For example, an enterprise may have no policies in place to prevent a malicious user from launching a virtual machine image which attaches to storage resources containing valuable company data. Such breaches can result in data loss, financial loss, and irreparable damage to reputation for the enterprise. As even this simple example illustrates, the question of who is launching what particular virtual machine image with access to what sensitive corporate data is an important concern.

Currently, cloud vendors for IaaS networks offer limited access control support. IaaS networks have management interfaces that allow users to sign on to the network, choose virtual machine images, launch these images, and attach to storage resources. However, the management interface typically does not evaluate user identities, image attributes, sensitivity of data in these storage volumes, and other factors before deciding whether to launch an image as requested by a user.

For instance, in a typical IaaS cloud, virtual machine images are often accessible through a public catalog of images, and many cloud services simply tag these images to identify whether the image is public or private and to identify which user owns which image, without regard to what user is launching the image or what permissions the user has. However, such images may not have been scanned for potential vulnerabilities, malware, or even whether they are known and working images. It is undesirable for an enterprise's network for any user to be able to launch and attach such an image and access storage resources, such as credit card records or other confidential information.

IaaS management solutions offer no capability to define policies over user identities, image attributes, and sensitivity of the data in storage resources to which images attach. To better identify, minimize, and remediate data risk, enterprises need visibility over who is launching what images with access to what data, and they also need policy-based controls that are able to allow or block these actions.

SUMMARY

Embodiments presented herein include a method for enforcing policy-based compliance in launching a virtual machine image configuration. This method includes receiving a request to launch a virtual machine image having a plurality of attributes. The request specifies a storage resource to attach the launched virtual machine image. This method also includes determining whether the request conforms to a policy. If the request conforms to the policy, then the request is forwarded to a cloud management platform, where the cloud management platform may launch the virtual machine image or forward the request to a policy manager for approval. In a particular embodiment, this method may further include receiving a reconfiguration request to attach the virtual machine image to a second resource and determining whether the request conforms to the policy. If the request conforms to the policy, then the request is forwarded to a cloud management platform for attachment.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
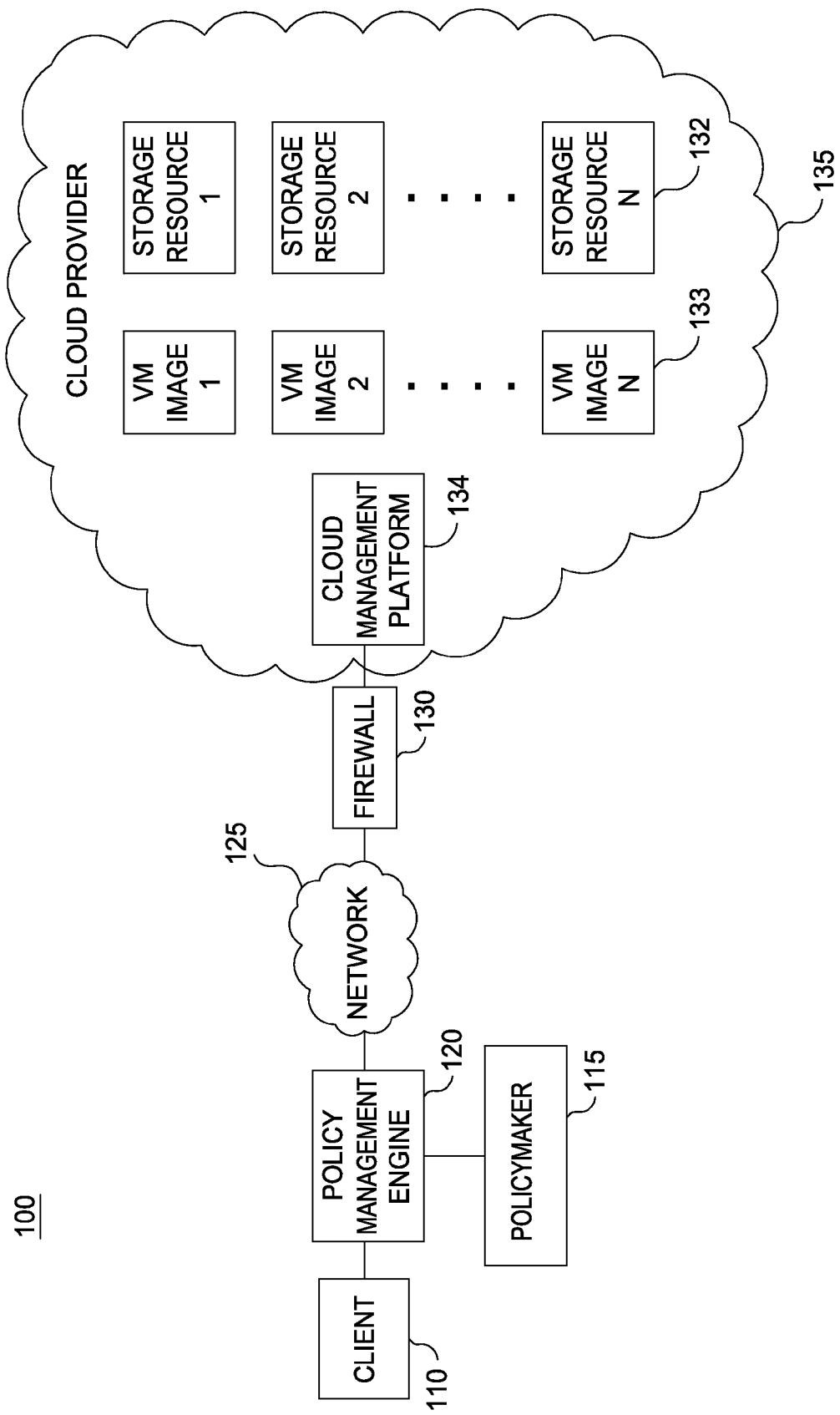
FIG. 1 illustrates an example computing environment, according to one embodiment.

Embodiments presented herein provide techniques for defining and enforcing access policies in an IaaS cloud network. These techniques tie user identities, image attribute assessments, and data sensitivity assessments of visible data into enforceable policies. Based on these, or other factors, an information security officer can define policies specifying what conditions, such as user credentials or image attributes, are required to launch an image or attach to a certain identified storage resource within the Infrastructure as a Service (IaaS) cloud network. In one embodiment, a policy management engine serves as an intermediary for virtual machine image access requests in the network. For example, when a user, through a client system, signs on to the network and requests to launch a virtual machine image and to attach that image to storage resources in the cloud, the policy management engine intercepts the request. The policy management engine then determines whether the request conforms to policies based on user identity, image attributes, data in the storage resources, and possibly other factors. In other cases, the policy management engine may also use previous determinations to evaluate whether the virtual machine image is approved for the user to launch and access the given storage resources.

Depending on whether launching the requested virtual machine image is consistent with the policies, the policy management engine allows the request, blocks the request, or triggers a workflow requiring approval of a manager (e.g., an enterprise's information security officer). By tying identity, image assessments, and data sensitivity together into definable and enforceable policies, the policy management engine provides control over who launches what virtual machine images in a cloud network and accesses sensitive data.

In another embodiment, the policy management engine monitors the activity of a virtual machine image within the IaaS cloud. A user may reconfigure a running instance of a virtual machine image to attach that instance to different storage resources. This presents risk because although the policy management engine may have allowed the virtual machine image to attach to the previous storage resource, the configuration of the image may not be compatible with another resource. For example, policy may have allowed the virtual machine image to attach to the current storage resource despite the image not being patched with the latest security updates. This is not a large concern in cases where the data in the storage resource is of low sensitivity. However, this presents a problem when that same virtual machine image requests to attach to a storage volume with data of high sensitivity, such as confidential customer data, and there may be policy that accounts for this problem. In any case, the policy management engine intercepts this request and determines if the request conforms to a policy, which may be created by tying together user identity, image attributes, and the data in the storage resource. Finally, depending on whether the request conforms for policy, the policy management engine allows the request to proceed, blocks the request, or triggers a management approval workflow.

The policy management engine may be located on a variety of systems within an enterprise network. For example, the policy management engine may be hosted within a cloud security broker. In another embodiment, the policy management engine may be hosted inside a network firewall and the cloud management interface. In such a case, when a user accesses an enterprise network in order to access and launch virtual machines on a cloud provider infrastructure, the policy management engine may intercept/monitor requests before they exit the enterprise network.

In one embodiment, the policy management engine includes a rules component, a risk analysis component, and an enforcement component. The rules component includes policies defined by a policy manager enforced by the policy management engine. The risk analysis component determines whether allowing a given user to launch (or reconfigure) a given virtual machine to access cloud based storage resources conforms to a policy. The enforcement component enforces the policies by allowing or denying the request to launch the virtual machine image or by triggering a management workflow.

In one embodiment, the rules component has policies defined to minimize risk by tying together sources of user identities, sources of image attributes, and sources of data sensitivity within a particular IaaS cloud network. These sources can be derived in several ways. For example, cloud security brokers can be used to link IaaS management identities with enterprise identities to create identity sources. Further, sources of image attributes may be obtained by assessing virtual machine images. This includes not only the images that a user requests to launch, but also known images, such as those made available on a cloud service's public catalog. These images may be assessed offline, where possible, for vulnerabilities and malware, or they may be placed in a quarantine network for online malware configuration and vulnerability assessment using standard tools in the industry. Sources of data sensitivity may be obtained, for example, through data tagging storage volumes and data classification through content inspection. For instance, by forwarding management traffic though a proxy server, such as cloud security broker, it is possible to identify management traffic where storage volumes are being attached to an instance. Data classification tools (e.g., such as data loss prevention tools) can then be used to scan these volumes and classify them. Using these sources, a policy manager can define policies where corporate identities and roles are tied to permissions to launch images that can access data of a specific sensitivity, where those images conform to certain standards of malware, configuration, and vulnerability assessments.

The risk analysis component determines whether launch requests conform to policy using these sources and policies. For example, the risk analysis component may evaluate factors such as allowing a certain level of user to launch a certain virtual machine image which attaches to a storage resource by evaluating the attributes of the image, including its applications, malware, open ports, whether it has an identifier associated with a known image, when the image was last evaluated, and the like. Then, the enforcement component allows the request, blocks the request, or triggers a management workflow for approval. The policy manager may create additional rules for how to handle blocked requests.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. Indeed, the virtual machine images and storage resources described here are located in a cloud computing network.

FIG. 1 illustrates an example computing environment 100 configured to enforce policy in launching virtual machine images in an IaaS cloud network, according to one embodiment. As shown, the computing environment 100 includes a policy management engine 120 which contains rules defined by a policy manager 115 and is connected to a network 125. Further, the computing environment 100 includes a cloud provider 135, which contains a cloud management platform 134, one or more virtual machine images 133, and one or more storage resources 132.

The policy management engine 120 can be placed in different areas of the example computing environment 100. For instance, as shown, the policy management engine 120 is situated as an intermediary between a client system 110 (e.g., a desktop computer, laptop computer, tablet, or smartphone device, etc.) and network 125. However, the policy management engine 120 may also be situated between a network firewall 130 and a cloud management platform 134. Additionally, the policy management engine may be situated in front of network firewall 130. In each case, the policy management engine is generally configured to monitor network traffic to a cloud provider 135.

The client system 110 requests to launch a virtual machine image 133 on cloud provider 135. Further, the request may specify that virtual machine image 133 should attach to one of the storage resources 132. In one embodiment, before reaching the cloud management platform 134, the policy management engine 120 intercepts the request and determines whether it complies with a set of policies. As enterprises move data to cloud-based hosting solutions, they need control over how and what systems access these data resources. For example, a policy may specify that a user may access a particular subset of storage resources. Further, another policy may specify that only images that have the certain specified security updates may attach to that particular subset. If the request is consistent with these policies, the policy management engine 120 allows the request to proceed. If not, the policy management engine 120 blocks the request or triggers a management approval workflow. For instance, the enterprise may create a policy allowing a web administrator to attach to customer backend data yet only launch a limited set of known and approved images. The policy management engine in this instance may allow requests from a web administrator for this type of launch, but it may block requests from the web administrator to launch an unknown image to access that same data. Conversely, an enterprise may create another policy allowing a developer to launch various types of images to test the vulnerability of the network yet only to attach to a very limited subset of data. The policy management engine in this instance may allow a request by the developer to launch a less robust virtual machine image to access general data but may block requests by the developer to launch that same image to access client data.

Figure 2:
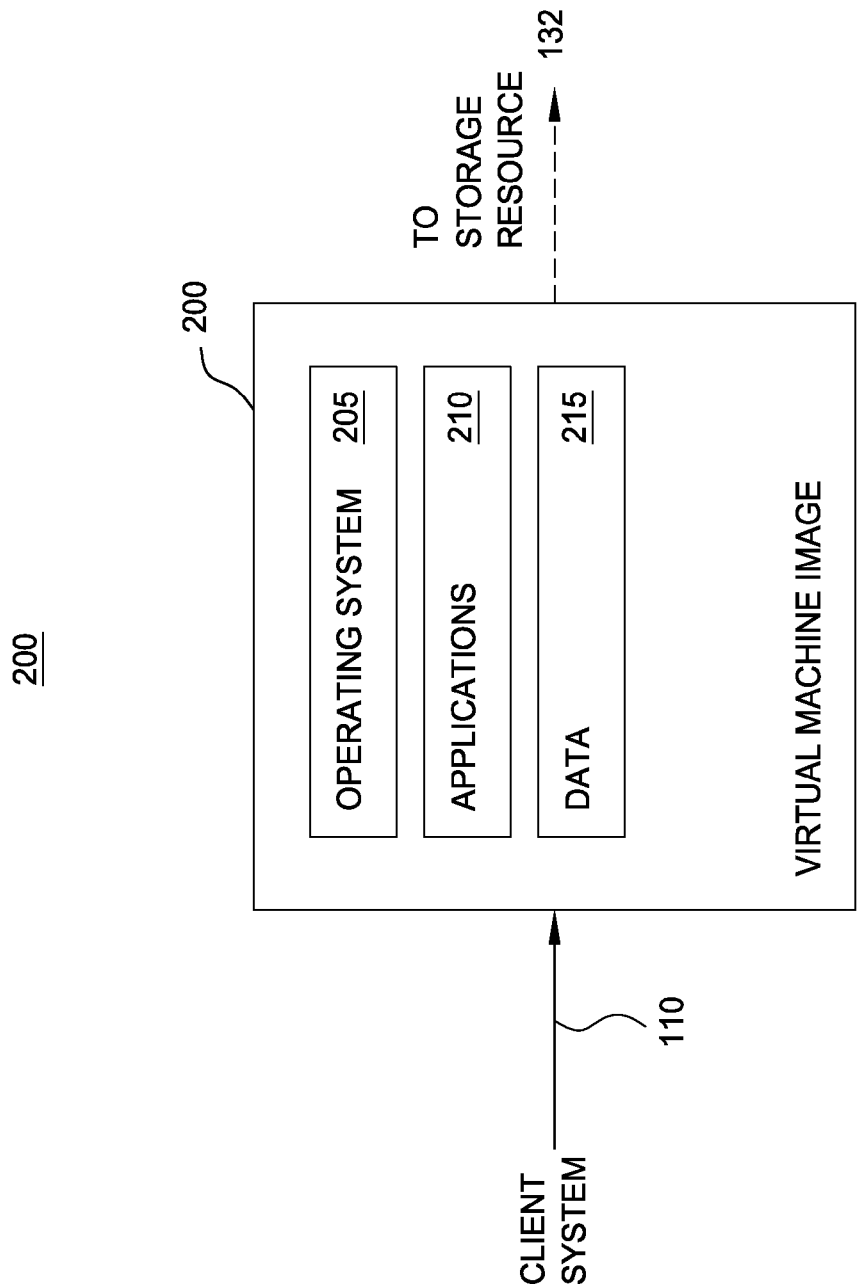
FIG. 2 illustrates a virtual machine image instance, according to one embodiment.

FIG. 2 illustrates an example virtual machine image 200, according to one embodiment. As shown, the virtual machine image 200 may include an operating system 205, applications 210, and data 215. Of course, an actual virtual machine image will include a variety of additional components. A client system 110 may request to launch virtual machine image 200, which may be configured to attach to a storage resource 132, which a policy management engine intercepts. The operating system 205, applications 210, and data 215 and the additional components may all serve as attributes that the policy management engine evaluates in this assessment. For instance, the image may be assessed for whether it has already been scanned for malware, whether malware exists, or whether the operating system has been updated with the latest security patches. Additionally, applications within a virtual machine image may also be assessed for security vulnerabilities. By making these assessments of the virtual machine image 200, the policy management engine can determine risk of launching it within the network and allowing it to access a particular storage resource.

Figure 3:
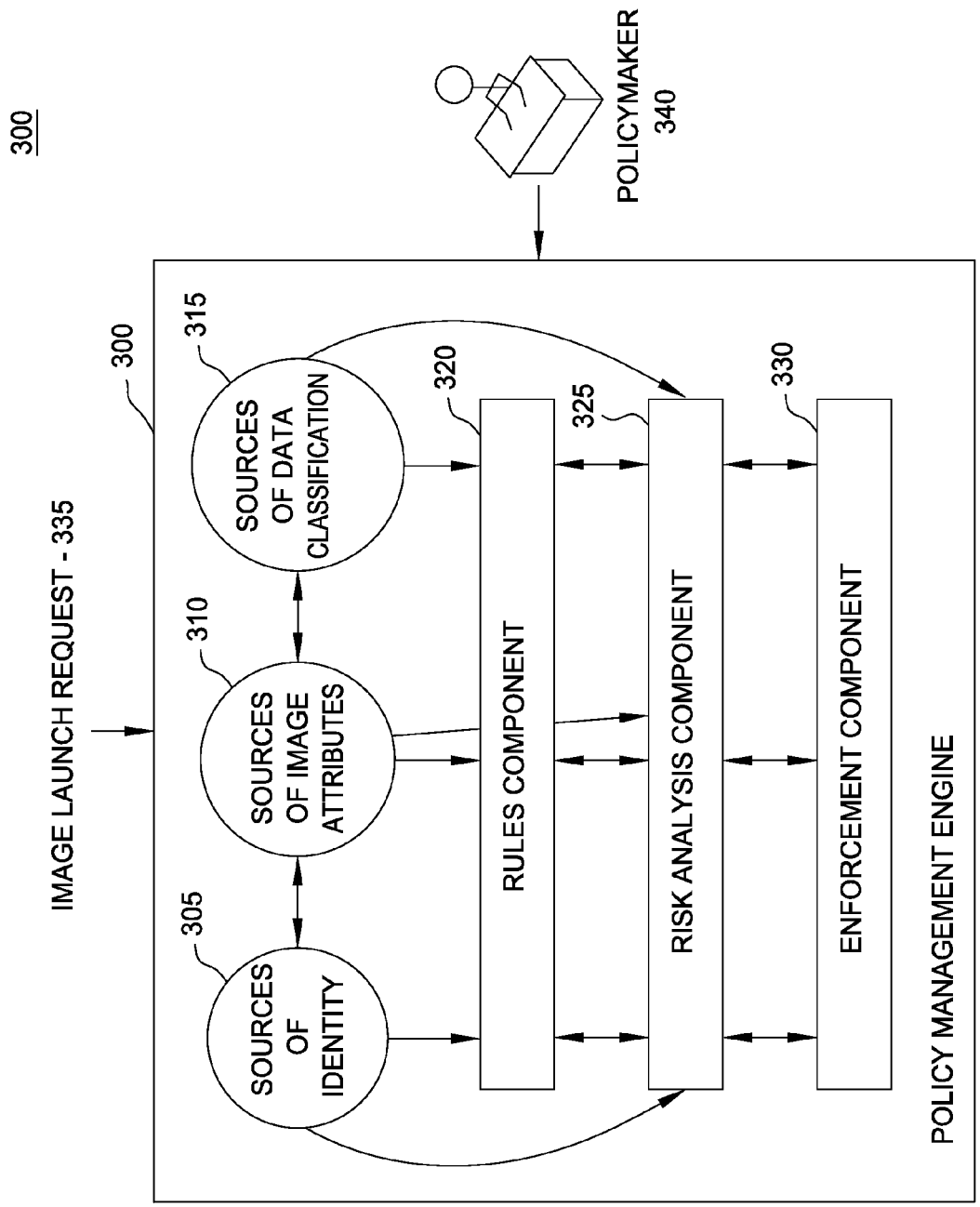
FIG. 3 illustrates an example policy management engine, according to one embodiment.

FIG. 3 illustrates an example of a policy management engine 300, according to one embodiment. In this example, the policy management engine 300 includes a rules component 320, risk analysis component 325, and an enforcement component 330. The rules component 320 includes enforceable policies defined by policy manager 340. Such policies may limit access to particular virtual machine images and particular subsets of data by certain levels of users. These policies may be defined using sources of identity 305, sources of image attributes 310, and sources of data classification 315.

When the policy management engine 300 determines that a user is requesting to launch an image launch request 335 (or alternatively, a previously launched image requests to attach to another storage resource), the risk analysis component 325 determines whether policy is consistent in allowing the request to proceed. Drawing on a previous example, policy may allow a developer to launch various kinds of images, including those that have been evaluated to contain malware, but not allow the developer to access storage resources containing sensitive company data. If the developer makes a request to launch a virtual image machine instance that is known to contain malware, the risk analysis component 325 may determine the request is not consistent with policy. As another example, policy may allow a known user, who has previously launched a certain virtual machine image with access to a particular storage resource, to re-launch that same virtual machine image and access that same storage resource, and the risk analysis component 325 may determine that there is less risk in allowing that request by that known user to proceed. Further, the enforcement component 330 enforces these policies by making a determination of whether to allow image launch request 335 to proceed, to block the image launch request 335, or trigger a management approval workflow.

Figure 4:
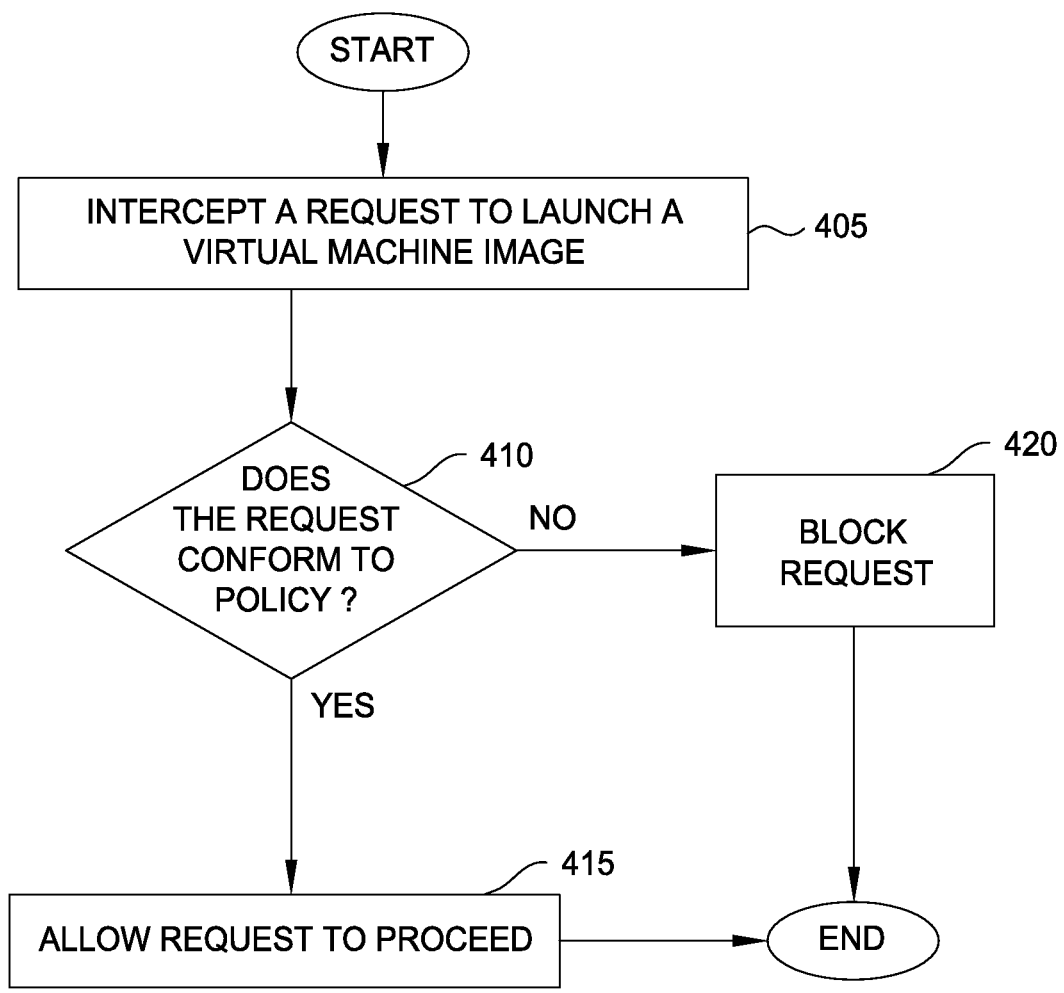
FIG. 4 illustrates a method for enforcing policy-based compliance in an IaaS cloud upon a request to launch a virtual machine image, according to one embodiment.

FIG. 4 illustrates a method 400 for enforcing policy-based compliance in launching virtual machine images in an IaaS cloud network through a policy management engine, according to one embodiment. In this example, a client is presumed to have requested to launch a virtual machine image and have that image attach to a storage resource on a cloud provider network. As shown, the method 400 begins at step 405, where the policy management engine intercepts the request.

At step 410, the policy management engine determines whether the launch conforms to a policy. The policy may be based on user identity, the attributes of the virtual machine image, and the classifications meta-data in the data set, and other possible characteristics. Upon this determination, the policy management engine either allows the request to proceed, as shown in step 415, or blocks the request, as shown in step 420. A policy manager may create additional rules to handle instances where the policy management engine blocks a request.

Figure 5:
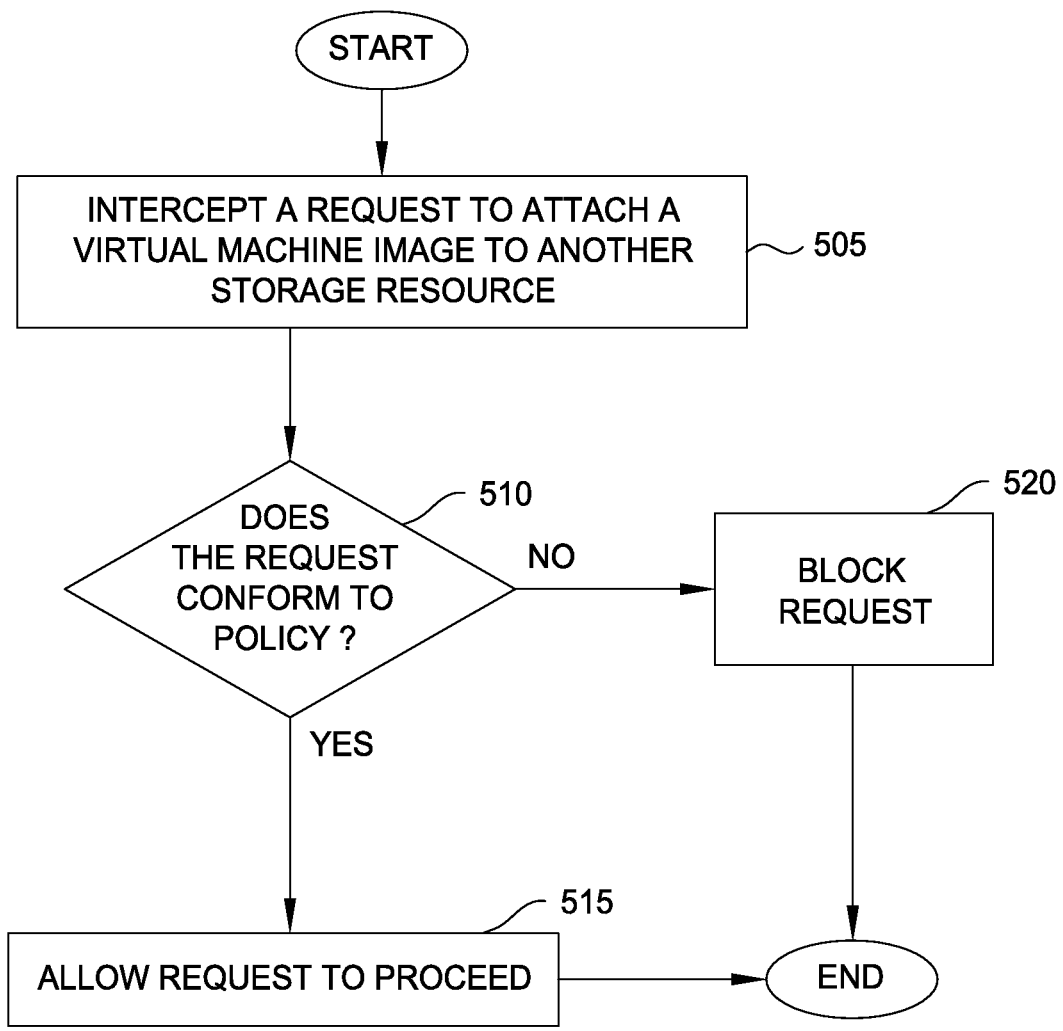
FIG. 5 illustrates a method for enforcing policy-based compliance in an IaaS cloud upon an image request to attach to a different storage resource, according to one embodiment.

FIG. 5 illustrates a method 500 for enforcing policy-based compliance in attaching a reconfigured virtual machine image to a different storage resource in an IaaS cloud network through a policy management engine, according to one embodiment. This situation may arise when, for example, a user reconfigures a virtual machine image instance that has complied with policy when launched, but the user now requests to attach that virtual machine image to a different storage resource. The policy management engine intercepts such requests. In this example, the image is presumed to have already been attached to a previous storage resource prior to being reconfigured.

As shown, the method 500 begins at step 505, where the policy management engine 300 intercepts a request from the image to attach to a different storage resource. Next, at step 510, the policy management engine evaluates attributes to decide if the request conforms to policy. For example, the policy management engine 300 might evaluate the identity of the user, the attributes of the virtual machine image, and the data in the storage resource. Upon this determination, the policy management engine either allows the request to proceed (step 515) or it blocks the request (step 520). A policy manager may create additional rules to handle instances where the policy management engine blocks a request.

Figure 6:
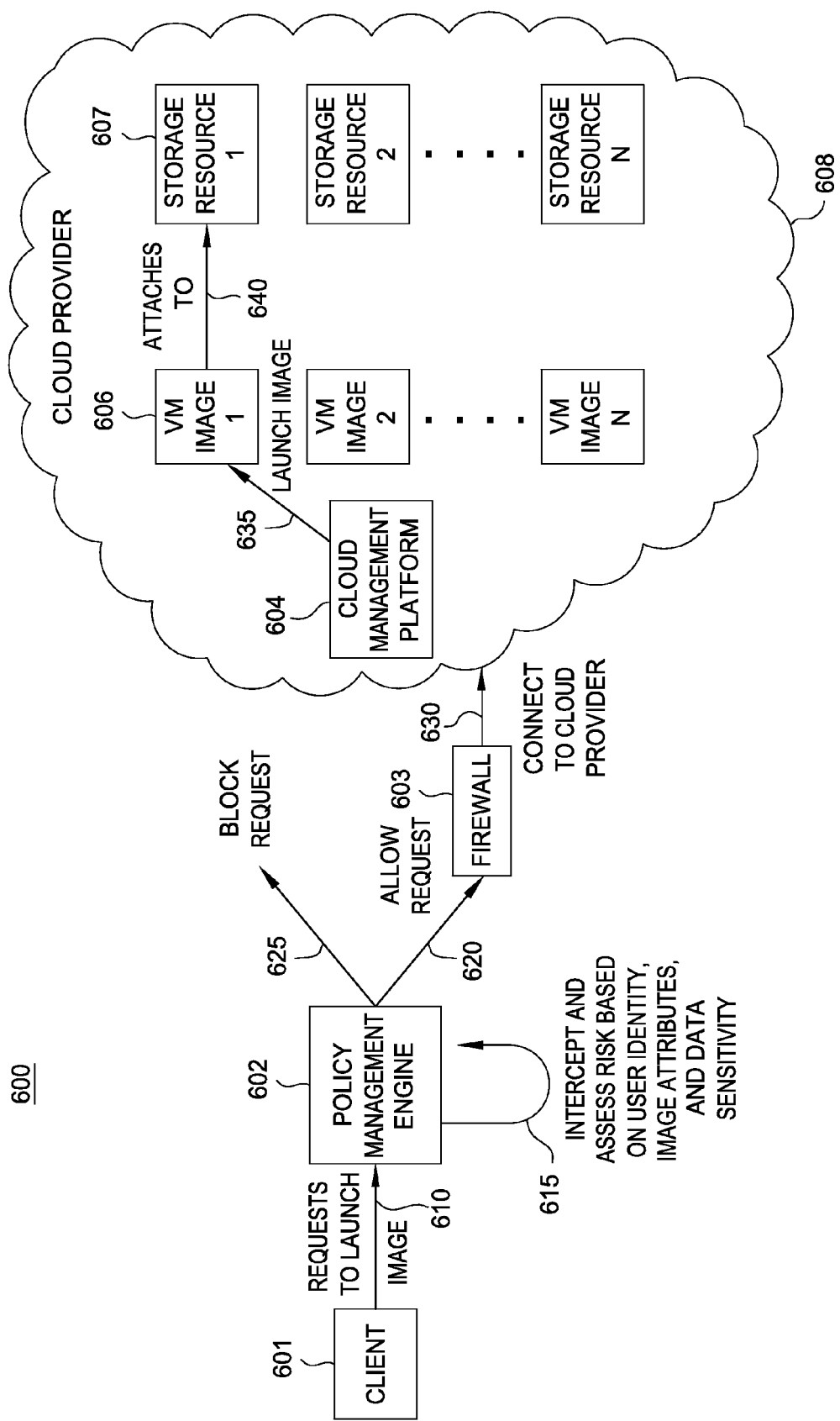
FIG. 6 illustrates a sequence diagram of a client computer requesting to launch a virtual image on an IaaS cloud network, according to one embodiment.

FIG. 6 illustrates a sequence diagram 600 for enforcing policy-based compliance in an enterprise network where a client 601 requests to launch a virtual machine image 606 attached to storage resource 607 located in a cloud provider 608, according to one embodiment. As noted, the client 601 requests to launch virtual machine image 606 and have the virtual machine image 606 attach to storage resources identified in the request (step 610). Before reaching the cloud provider 608, a policy management engine 602 intercepts the request and assesses data risks based on a variety of factors (step 615). For example, as shown, the policy management engine may rely on sources of user identity, image attributes, and data sensitivity. After determining whether the request is consistent with policies, the policy management engine 602 blocks the request (step 625) or allows the request to proceed (step 620). If the policy management engine 602 allows the request, then the request proceeds through a firewall 603 and to the cloud management platform 604 (step 630) within cloud provider 608. Next, the virtual machine image 606 is launched (step 635). Finally, the virtual machine image 606 attaches to the requested storage resource (step 640).

Figure 7:
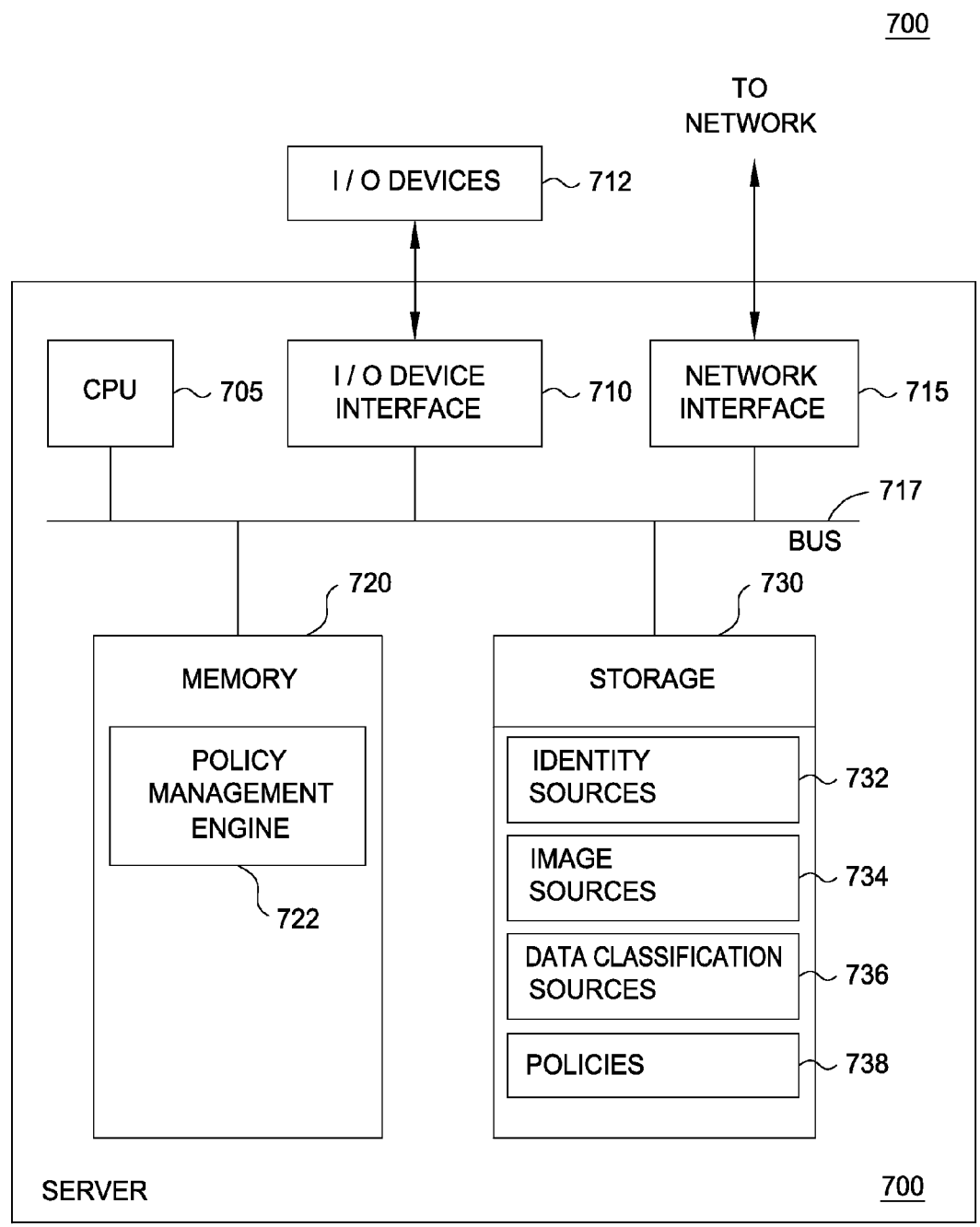
FIG. 7 illustrates an example server configured with a policy management engine, according to one embodiment.

FIG. 7 illustrates a server 700 configured with a policy management engine, according to one embodiment. As shown, the server 700 includes, without limitation, a central processing unit (CPU) 705, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 730. The bus 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes a policy management engine 722. Storage 730 includes identity sources 732, image attribute sources 734, data classification sources 736, and rules 738, according to an example embodiment. These sources need not actually be stored on the server 700 so long as they are accessible to the policy management engine 722. Identity sources 732, image attribute sources 734, and data classification sources 736 may be derived in several ways. For example, a cloud security broker may be used to tie identity and management roles within an enterprise network. Additionally, image attributes may be assessed offline or in a quarantined network for its attributes, including, but not limited to, vulnerabilities, malware, and applications. Further, data classification sources may be obtained through scanning cloud storage volumes and tagging the data. Data classification tools (e.g., data loss prevention tools) can then be used to scan these volumes and tag them.

Using these sources, a policy manager can define policies where corporate identities and roles are tied to permission to launch images that can access data of a specific sensitivity, where those images conform to certain standards of malware, configuration, and vulnerability assessments. A policy manager, such as an enterprise's information security officer, may create rules 738 using the above sources.

Advantageously, embodiments presented herein provide techniques for defining and enforcing access policies to identify, minimize, and remediate risk in managing access control within an IaaS cloud network. By tying user identity sources, virtual machine image attribute sources, and data sensitivity sources, a policy manager, such as an enterprise's information security officer, may create policies for virtual machine image configurations. Then, a policy management engine uses these policies in assessing access risks and determining whether to allow or block requests to launch a particular virtual machine image. For example, when a database administrator requests to launch a virtual machine image that attaches to a client database, the policy management engine intercepts the request. If the policy is consistent with the request to attach to the requested storage resources, then the policy management engine allows the request to proceed, and likewise if there is no such policy in place, then the policy management engine blocks the request or triggers a management approval workflow.

Further, the policy management engine monitors virtual machine image activity so that upon reconfiguration of the image to attach to another storage resource, the policy management engine again assesses factors such as user identity, image attributes, and data sensitivity before either allowing or blocking the request. These techniques for policy-based enforcement provide control over virtual machine image access.

While the foregoing is directed to embodiments of the present invention, other and further embodiments of the invention may be devised without departing from the basic scope thereof, and the scope thereof is determined by the claims that follow.

What is claimed is:

1. A method for enforcing policy-based compliance in launching a virtual machine image configuration, the method comprising:
    receiving a request to launch a virtual machine image having a plurality of attributes, wherein the request specifies at least a first storage volume to attach to the launched virtual machine image, wherein the first storage volume stores data accessible to the launched virtual machine image once attached, and wherein the first storage volume has associated metadata indicating a measure of sensitive of data on the first storage volume;
    evaluating the virtual machine image identified in the request and the metadata associated with the first storage volume to determine whether the request conforms to a policy; and
    upon determining that the virtual machine image identified in request conforms to a policy, forwarding the request to a cloud management platform, wherein the cloud management platform launches the virtual machine image and attaches the launched virtual machine image to the first storage volume.

2. The method of claim 1, wherein the cloud management platform forwards the request to a policy manager for approval.

3. The method of claim 1, wherein the attributes include at least one of a user identifier, an operating system, an operating system version, and an application identifier.

4. The method of claim 1, wherein determining whether the request conforms to the policy comprises determining whether a user making the request is authorized to attach virtual machine instances to the first storage volume.

5. The method of claim 1, wherein determining whether the request conforms to the policy comprises determining whether a user making the request is authorized to launch an instance of the virtual machine image.

6. The method of claim 1, further comprising:
    receiving a reconfiguration request to attach the launched virtual machine image to a second storage volume, wherein the second storage volume stores data accessible to the launched virtual machine image once attached and wherein the second storage volume has associated metadata indicating a measure of sensitivity of data on the second storage volume; and
    upon determining that the reconfiguration request conforms to the policy, forwarding the request to the cloud management platform, wherein the cloud management platform attaches the launched virtual machine image to the second storage volume.

7. A method for enforcing policy-based compliance in a virtual machine image reconfiguration, the method comprising:
    receiving a request to attach a running instance of a virtual machine image having a plurality of attributes to a first storage volume, wherein the first storage volume stores data accessible to the running instance of the virtual machine image once attached and wherein the first storage volume has associated metadata indicating a measure of sensitivity of data on the first storage volume;
    evaluating the virtual machine image identified in the request and the metadata associated with the first storage volume to determine whether the request conforms to a policy; and
    upon determining that the virtual machine image identified in request conforms to the policy, forwarding the request to a cloud management platform, wherein the cloud management platform attaches the virtual machine image to the first storage volume.

8. The method of claim 7, wherein the virtual machine image attributes include at least one of a user identifier, an operating system, an operating system version, and an application identifier.

9. The method of claim 7, wherein determining whether the request conforms to the policy comprises determining whether a user making the request is authorized to attach virtual machine instances to the first storage volume.

10. The method of claim 7, wherein determining whether the request conforms to the policy comprises determining whether the virtual machine image is authorized to attach to the first storage volume.

11. A non-transitory computer-readable storage medium storing instructions, which, when executed on a processor, performs an operation for enforcing policy-based compliance launching a virtual machine image configuration, the operation comprising:
receiving a request to launch a virtual machine image having a plurality of attributes, wherein the request specifies at least a first storage volume to attach to the launched virtual machine image, wherein the first storage volume stores data accessible to the launched virtual machine image once attached, and wherein the first storage volume has associated metadata indicating a measure of sensitivity of data on the first storage volume;
evaluating the virtual machine image identified in the request and the metadata associated with the first storage volume to determine whether the request conforms to a policy; and
upon determining that the virtual machine image identified in request conforms to the policy, forwarding the request to a cloud management platform, wherein the cloud management platform launches the virtual machine image and attaches the launched virtual machine image to the first storage volume.

12. The computer-readable storage medium of claim 11, wherein the cloud management platform forwards the request to a policy manager for approval.

13. The computer-readable storage medium of claim 11, wherein the attributes include at least one of a user identifier, an operating system, an operating system version, and an application identifier.

14. The computer-readable storage medium of claim 11, wherein determining whether the request conforms to the policy comprises determining whether a user making the request is authorized to attach virtual machine instances to the first storage volume.

15. The computer-readable storage medium of claim 11, wherein determining whether the request conforms to the policy comprises determining whether a user making the request is authorized to launch an instance of the virtual machine image.

16. The computer-readable storage medium of claim 11, the operation further comprising:
receiving a reconfiguration request to attach the launched virtual machine image to a second storage volume, wherein the second storage volume stores data accessible to the launched virtual machine image once attached and wherein the second storage volume has associated metadata indicating a measure of sensitivity of data on the second storage volume; and
upon determining that the reconfiguration request conforms to the policy, forwarding the request to the cloud management platform, wherein the cloud management platform attaches the launched virtual machine image to the second storage volume.

17. A system, comprising:
a processor and
a memory hosting an application, which, when executed on the processor, performs an operation for enforcing policy-based compliance in launching a virtual machine image configuration, the operation comprising:
receiving a request to launch a virtual machine image having a plurality of attributes, wherein the request specifies at least a first storage volume to attach to the launched virtual machine image, wherein the first storage volume stores data accessible to the launched virtual machine image once attached, and wherein the first storage volume has associated metadata indicating a measure of sensitivity of data on the first storage volume,
evaluating the virtual machine image identified in the request and the metadata associated with the first storage volume to determine whether the request conforms to a policy, and
upon determining that the virtual machine image identified in request conforms to the policy, forwarding the request to a cloud management platform, wherein the cloud management platform launches the virtual machine image and attaches the launched virtual machine image to the first storage volume.

18. The system of claim 17, wherein the cloud management platform forwards the request to a policy manager for approval.

19. The system of claim 17, wherein the attributes include at least one of a user identifier, an operating system, an operating system version, and an application identifier.

20. The system of claim 17, wherein determining whether the request conforms to the policy comprises determining whether a user making the request is authorized to attach virtual machine instances to the first storage volume.

21. The system of claim 17, wherein determining whether the request conforms to the policy comprises determining whether a user making the request is authorized to launch an instance of the virtual machine image.

22. The system of claim 17, the operation further comprising:
receiving a reconfiguration request to attach the launched virtual machine image to a second storage volume, wherein the second storage volume stores data accessible to the launched virtual machine image once attached and wherein the second storage volume has associated metadata indicating a measure of sensitivity of data on the second storage volume; and
upon determining that the reconfiguration request conforms to the policy, forwarding the request to the cloud management platform, wherein the cloud management platform attaches the launched virtual machine image to the second storage volume.

* * * * *